(12) United States Patent
Allan (10) Patent No.: US 10,940,977 B2
(45) Date of Patent: Mar. 9, 2021

(54) MULTI-VESSEL RESERVOIR ASSEMBLY

(71) Applicant: ABC GROUP INC., Toronto (CA)

(72) Inventor: Richard Allan, Holland Landing (CA)

(73) Assignee: ABC TECHNOLOGIES INC., Toronto (CA)

(*) Notice: Subject to any disclaimer, the term of this patent is extended or adjusted under 35 U.S.C. 154(b) by 99 days.

(21) Appl. No.: 16/306,509

(22) PCT Filed: May 30, 2017

(86) PCT No.: PCT/CA2017/050657
§ 371 (c)(1),
(2) Date: Nov. 30, 2018

(87) PCT Pub. No.: WO2017/205973
PCT Pub. Date: Dec. 7, 2017

(65) Prior Publication Data
US 2019/0152646 A1    May 23, 2019

Related U.S. Application Data

(60) Provisional application No. 62/343,102, filed on May 30, 2016.

(51) Int. Cl.
*B65D 21/02* (2006.01)
*B60K 11/02* (2006.01)
(Continued)

(52) U.S. Cl.
CPC .......... *B65D 21/0201* (2013.01); *B60K 11/02* (2013.01); *B60K 15/03* (2013.01);
(Continued)

(58) Field of Classification Search
CPC .... B65D 21/0201; B65D 25/04; B60K 11/02; B60K 15/03177; B60K 15/035; B60K 15/03006; B60K 15/03; B60T 17/06
(Continued)

(56) References Cited

U.S. PATENT DOCUMENTS

| 1,656,427 A | * | 1/1928 | Davis, Jr. | B60P 3/221 |
| | | | | 220/564 |
| 1,952,867 A | * | 3/1934 | Jensen | B60P 3/24 |
| | | | | 220/564 |

(Continued)

FOREIGN PATENT DOCUMENTS

| DE | 4103523 A1 | 8/1992 |
| WO | 00/51858 A1 | 9/2000 |
| WO | 2014/094919 A1 | 6/2014 |

OTHER PUBLICATIONS

The International Search Report issued in International Application No. PCT/CA2017/050657, dated Oct. 2, 2017.
(Continued)

*Primary Examiner* — Robert J Hicks
(74) *Attorney, Agent, or Firm* — Medler Ferro Woodhouse & Mills PLLC (57) ABSTRACT

A multi-vessel reservoir assembly is provided. The multi-vessel reservoir assembly comprises a first fluid vessel, a second fluid vessel, and at least one linkage positioned between the first and second fluid vessels. The at least one linkage serves to maintain the first and second fluid vessels in fixed and spaced-apart relationship relative to one another. The first and second fluid vessels are independent and separately operable.

19 Claims, 9 Drawing Sheets

(51) Int. Cl.
  *B65D 25/04* (2006.01)
  *B60K 15/03* (2006.01)
  *B60K 15/035* (2006.01)
  *B60T 17/06* (2006.01)

(52) U.S. Cl.
  CPC ........ *B60K 15/03177* (2013.01); *B65D 25/04* (2013.01); *B60K 15/035* (2013.01); *B60K 2015/0344* (2013.01); *B60K 2015/03118* (2013.01); *B60T 17/06* (2013.01)

(58) Field of Classification Search
  USPC .......... 220/563, 564, 562, 23.8, 23.2, 23.83, 220/555, 554, 553, 501
  See application file for complete search history.

(56) References Cited

U.S. PATENT DOCUMENTS

| | | | | |
|---|---|---|---|---|
| 2,075,977 | A * | 4/1937 | De Ganahl | B64D 37/02 220/651 |
| 2,092,392 | A * | 9/1937 | Hewitt | B60T 17/06 220/564 |
| 2,622,887 | A * | 12/1952 | Prior | B60K 15/00 280/833 |
| 2,720,182 | A * | 10/1955 | Brandon | F17C 1/002 114/74 R |
| 3,187,766 | A * | 6/1965 | Black | B60P 3/225 137/267 |
| 5,429,268 | A * | 7/1995 | Hale | F17C 1/00 206/443 |
| 6,227,230 | B1 * | 5/2001 | Huh | B60K 15/03006 137/255 |
| 2004/0142232 | A1 | 7/2004 | Risca et al. | |
| 2009/0090726 | A1 * | 4/2009 | Kawamata | F17C 1/06 220/586 |
| 2011/0062163 | A1 | 3/2011 | Hewkin | |

OTHER PUBLICATIONS

The Written Opinion of the International Searching Authority issued in International Application No. PCT/CA2017/050657, dated Oct. 2, 2017.

* cited by examiner

MULTI-VESSEL RESERVOIR ASSEMBLY

CROSS-REFERENCE TO RELATED APPLICATIONS

This application claims the benefit of U.S. Provisional Patent Application Ser. No. 62/343,102 filed 30 May 2016, which is hereby incorporated by reference in its entirety for all purposes.

FIELD

The present disclosure pertains to fluid reservoirs, and in particular to an automotive fluid reservoir assembly having multiple vessels, and more particularly where each vessel of the reservoir assembly is independently and separately-operable.

BACKGROUND

The automobile has a number of different fluid systems that provide for various operations, including hydraulic power transfer (i.e. as provided by brake, power steering and clutch fluids), lubrication (i.e. as provided by engine and transmission oil), cooling (i.e. as provided by engine and AC coolant fluids), fuel (i.e. as provided by diesel and gasoline), and cleaning (i.e. as provided by windshield washer fluid). With the advancement of automotive technologies, in particular with current mandates to reduce fuel consumption and reliance upon refined petroleum products, new engine systems with additional cooling and/or fluid mangement requirements are being introduced.

Of particular note are hybrid electric vehicles (HEV), plug-in hybrid electric vehicles (PHEV), and battery electric vehicles (BEV) which may require two or more independent and separately-operable cooling systems, that is multiple systems operable under different temperature and/or pressure regimes. In the standard vehicle layout, many packaging/component items for fluid systems are already fixed in place. Consequently, with the addition of new fluid system components, for example coolant reservoirs for battery/motor coolant systems in HEV/PHEV vehicles, space constraints require new items to be housed within the existing space allocated. An additional challenge is mounting attachment points and hose routings may be considered hard points, requiring solutions to work within the existing mounting and routing constraints.

In view of these various challenges, in particular to accommodate additional fluid reservoirs in the engine compartment, there is an ongoing need for new fluid management solutions.

SUMMARY

According to an aspect of the disclosure, provided is a multi-vessel reservoir assembly. The multi-vessel reservoir assembly comprises a first fluid vessel, a second fluid vessel, and at least one linkage positioned between the first and second fluid vessels. The at least one linkage serves to maintain the first and second fluid vessels in fixed and spaced-apart relationship relative to one another. The first and second fluid vessels are independent and separately operable.

BRIEF DESCRIPTION OF THE DRAWINGS

The foregoing and other features and advantages of the disclosure will be apparent from the following description of the disclosure as illustrated in the accompanying drawings. The accompanying drawings, which are incorporated herein and form a part of the specification, further serve to explain the principles of the disclosure and to enable a person skilled in the pertinent art to make and use the disclosure. The drawings are not to scale.

DETAILED DESCRIPTION

Specific embodiments of the present disclosure will now be described with reference to the Figures, wherein like reference numbers indicate identical or functionally similar elements. The following detailed description is merely exemplary in nature and is not intended to limit the disclosure or the application and uses of the disclosure. A person skilled in the relevant art will recognize that other configurations and arrangements can be used without departing from the scope of the disclosure. Furthermore, there is no intention to be bound by any expressed or implied theory presented in the preceding technical field, brief summary or the following detailed description.

Figure 1:
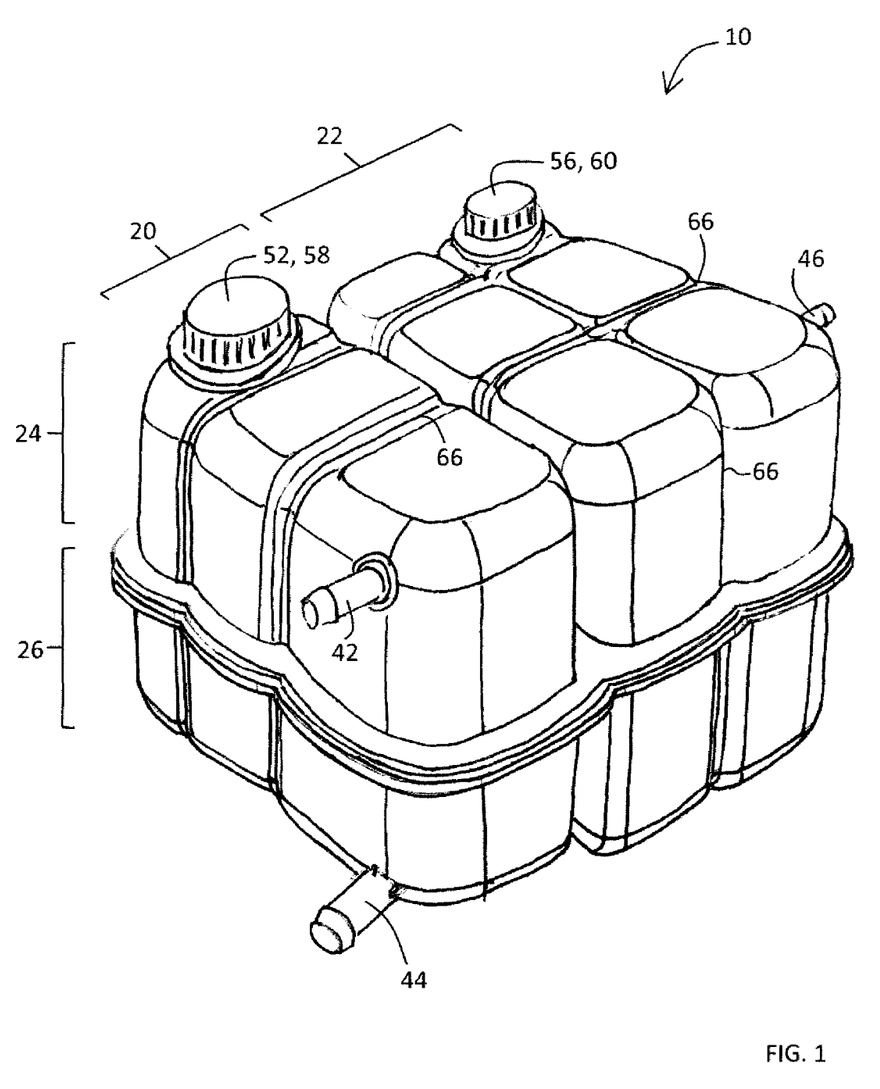
FIG. 1 is a top perspective view of a first embodiment of the multi-vessel reservoir assembly.

Turning now to FIG. 1, shown is a reservoir assembly 10 that includes at least two independent and separately-operable vessels. For the purposes of this description, the expression "independent and separately-operable" is intended to define an arrangement where each vessel forming part of the reservoir assembly 10 is capable of independent operation relative to the other vessel(s) forming part of the same reservoir assembly 10. For example, the operational temperature and/or pressure of a first vessel in the reservoir assembly 10 may be different from the operational temperature and/or pressure of a second vessel forming part of the same reservoir assembly 10. In another example, the type of fluid used in a first vessel of the reservoir assembly 10 may be an engine coolant, while the type of fluid used in a second vessel forming part of the same reservoir assembly 10 may be a brake fluid. In yet another example, a first vessel in the reservoir assembly 10 may be pressurized, for example when used as a surge tank in an engine coolant system, while a second vessel forming part of the same reservoir assembly 10 is non-pressurized, for example when used as a windshield washer fluid reservoir. While the first and second vessels may be operated as part of the same fluid system, they may also be used in an arrangement that has them hydraulically isolated from each other.

In the embodiment shown in FIGS. 1-7, the reservoir assembly 10 is presented as a multi-vessel reservoir assembly 10, including a first fluid vessel 20 and a second fluid vessel 22. The multi-vessel reservoir assembly 10 may be constructed in a number of ways, but as shown, it is presented as an assembly of a first reservoir member 24 and a second reservoir member 26. In this arrangement, the first reservoir member 24 may be regarded as an upper portion (as shown in isolation in FIG. 5), while the second reservoir member 26 may be regarded as a lower portion (as shown in isolation in FIG. 6).

Each vessel generally includes a housing defining an internal volume. The vessel may also include a plurality of internal walls that subdivide the vessel, and therein the internal volume, into multiple sub-chambers. When subdivided, the sub-chambers may be arranged to provide a fluid path that promotes the separation of gases and steam from the fluid (i.e. coolant), as generally known in the art. Having regard to FIG. 3, the first fluid vessel 20 includes a housing 28 and internal walls 30, therein defining sub-chambers 32a, 32b, 32c. The second fluid vessel 22 includes a housing 34 and internal walls 36, therein defining sub-chambers 38a, 38b, 38c, 38d, 38e, and 38f. It will be appreciated that the number, dimension and arrangement of the sub-chambers may be specifically selected for a particular application, and therefore variations of the arrangement exemplified herein are possible. It will further be appreciated that in some embodiments, one or both of the vessels may not contain any internal walls, thus presenting an undivided internal volume. Within each of the first and second fluid vessels 20, 22 the respective sub-chambers are interconnected via a series of openings 40 (see FIGS. 5a and 6) provided on the internal walls 30, 36, establishing the fluid path that permits the fluid to move therethrough.

Figure 2:
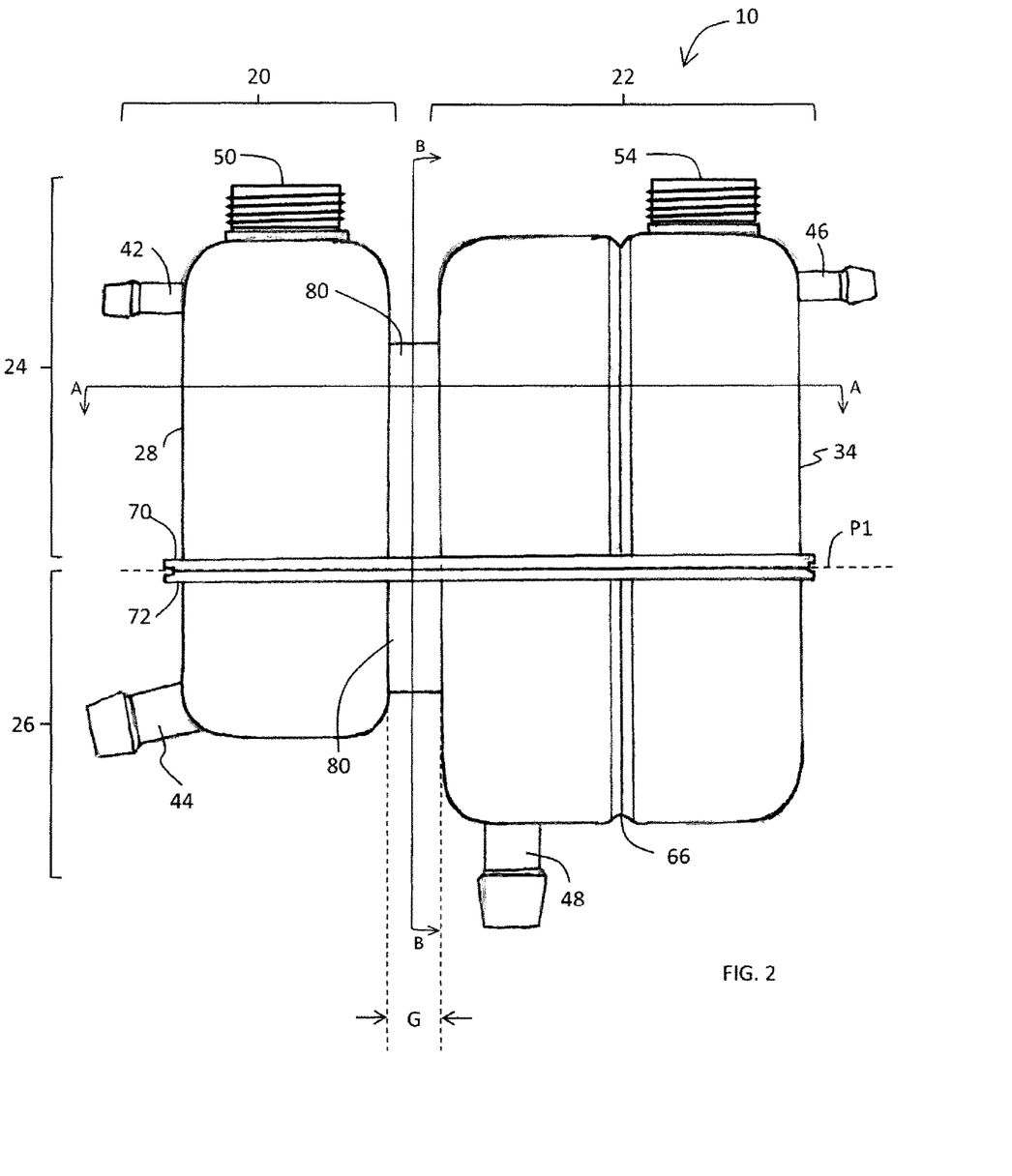
FIG. 2 is a side view of the embodiment of FIG. 1.

As best seen in FIG. 2, the multi-vessel reservoir assembly 10 is formed to present a gap G between the first and second fluid vessels 20, 22. In particular, the housings 28, 34 defining the internal volume of each of the first and second fluid vessels 20, 22 are generally separate and spaced-apart. The gap G serves to reduce the potential influence of one vessel upon the adjacent vessel. For example, the gap G may serve as a thermal break between the first and second fluid vessels 20, 22, reducing thermal exchange therebetween. The gap G may also serve to reduce expansion issues, for instance where a first vessel is operated at higher temperature and/or pressure and is likely to undergo moderate vessel expansion. With gap G, any such expansion of the first vessel as a result of temperature and/or pressure will have reduced influence on the second vessel forming part of the same reservoir assembly.

Each fluid vessel provides at least one inlet/outlet port, which may be a singular port (i.e. when the vessel is configured for use under both pressure and vacuum), or with multiple ports. In the present embodiment, each fluid vessel provides at least one inlet and at least one outlet. As shown, the first fluid vessel 20 provides a first inlet 42 configured to receive fluid into the interior volume of the vessel 20, and a first outlet 44 configured to release/discharge fluid from the interior volume of the vessel 20. The first fluid vessel 20, by virtue of the first inlet 42 and the first outlet 44 may form part of a closed fluid loop, for example as would be found in an automotive coolant system. The second fluid vessel 22 is similarly configured, with a second inlet 46 and a second outlet 48, and may also form part of a closed fluid loop.

Each of the vessels also comprise a suitable fill aperture and closure to enable fluid (i.e. coolant) to be added and/or removed from the internal volume, for example as would be required when filling and/or changing the fluid contained therein. As shown, the first fluid vessel 20 includes a first fill aperture 50 and a first closure 52 (see FIG. 1), while the second fluid vessel 22 includes a second fill aperture 54 and a second closure 56 (see FIG. 1). The form of the fill aperture and closure will depend on whether or not the vessel is intended to be operated under pressure. Where the vessels are operated as non-pressurized vessels, the area of the housing presenting the fill aperture may carry a suitable bead or collar on which a snap-fit closure cap can be fitted. Other arrangements for non-pressurized vessels may include a closure cap configured for threaded or bayonet-style engagement with the vessel housing. Where the vessels are operated as pressurized vessels, the area of the housing presenting the fill aperture may be provided with a threaded or bayonet-style interface to receive a pressure cap (i.e. a radiator-style cap). Pressure caps are known in the art, and generally provide an internal valve arrangement (i.e. a spring loaded disc valve) that opens to permit the venting of fluid from the vessel when the pressure exceeds a predefined threshold. In the embodiment shown in FIGS. 1-7, the vessels are shown as pressurized vessels and the first and second closures 52, 56 are shown as respective first and second pressure caps 58, 60 (see FIG. 1). In the first fluid vessel 20, the first pressure cap 58 cooperates with a first fluid release passage 62, while in the second fluid vessel 22, the second pressure cap 60 cooperates with a second fluid release passage 64 (first and second fluid release passages 62, 64 can be viewed in FIGS. 3, 5-7). The first and second fluid release passages 62, 64 each comprise an internally formed conduit that directs vented fluid to an area below the reservoir assembly 10. It will be appreciated that the first and second pressure caps 58, 60 may also be configured to release the vented fluid directly from the respective cap, generally to an area on top of the reservoir assembly 10.

Figure 3:
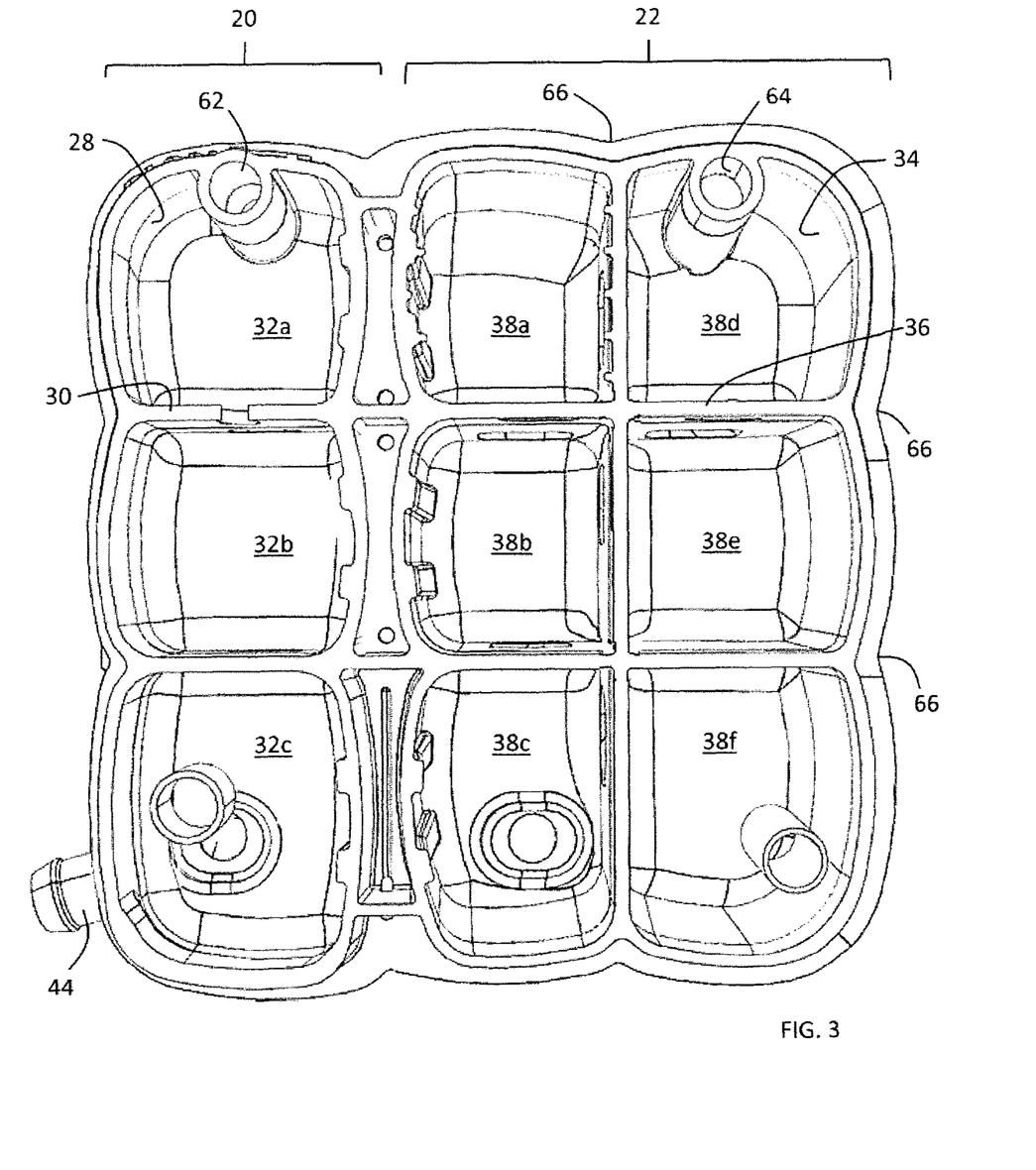
FIG. 3 is a sectional view of the embodiment of FIG. 1, through line A-A.

The housing defining the first and second fluid vessels 20, 22 may be shaped/formed with features that enhance strength, in particular when the vessels are intended for use under pressure. For example, in the embodiment shown, the respective housing 28, 34 of each of the first and second fluid vessels 20, 22 may be formed with billows 66 as shown. The positioning of the billows 66 on the first and second fluid vessels 20, 22 may coincide with the positioning of the respective internal walls 30, 34 (as seen in FIG. 3), therein forming a network on internal cross-braces that serve to resist vessel deformation under pressure.

One or both of the first and second fluid vessels may also be fitted with suitable sensors (not shown for clarity) to monitor the contents thereof. For example, sensors may be used that detect operational conditions including, but not limited to, temperature, pressure, and fluid level. One or both of the first and second fluid vessels may also include at least one suitable bracket (not shown for clarity) that permits the reservoir assembly to be mounted, for example in the engine compartment of the vehicle.

Each of the first and second reservoir members 24, 26 forming the multi-vessel reservoir assembly 10 are separately injection molded, and are formed with a peripheral flange 70, 72 forming part of the respective housing 28, 34. The peripheral flanges 70, 72 mate at an assembly plane P1 (see FIG. 2), which generally divides the reservoir assembly into the upper and lower reservoir members. The first and second reservoir members 24, 26 are joined together at the assembly plane P1 via the peripheral flanges 70, 72, as well as at intermediate points in gap G between the first and second fluid vessels 20, 22. As shown, between the first and second fluid vessels 20, 22, the housings 28, 34, separated by gap G, converge towards the assembly plane P1. Between the housings 28, 34, at least one linkage is provided to maintain the first and second fluid vessels 20, 22 in fixed and spaced-apart relationship relative to one another.

Figure 4:
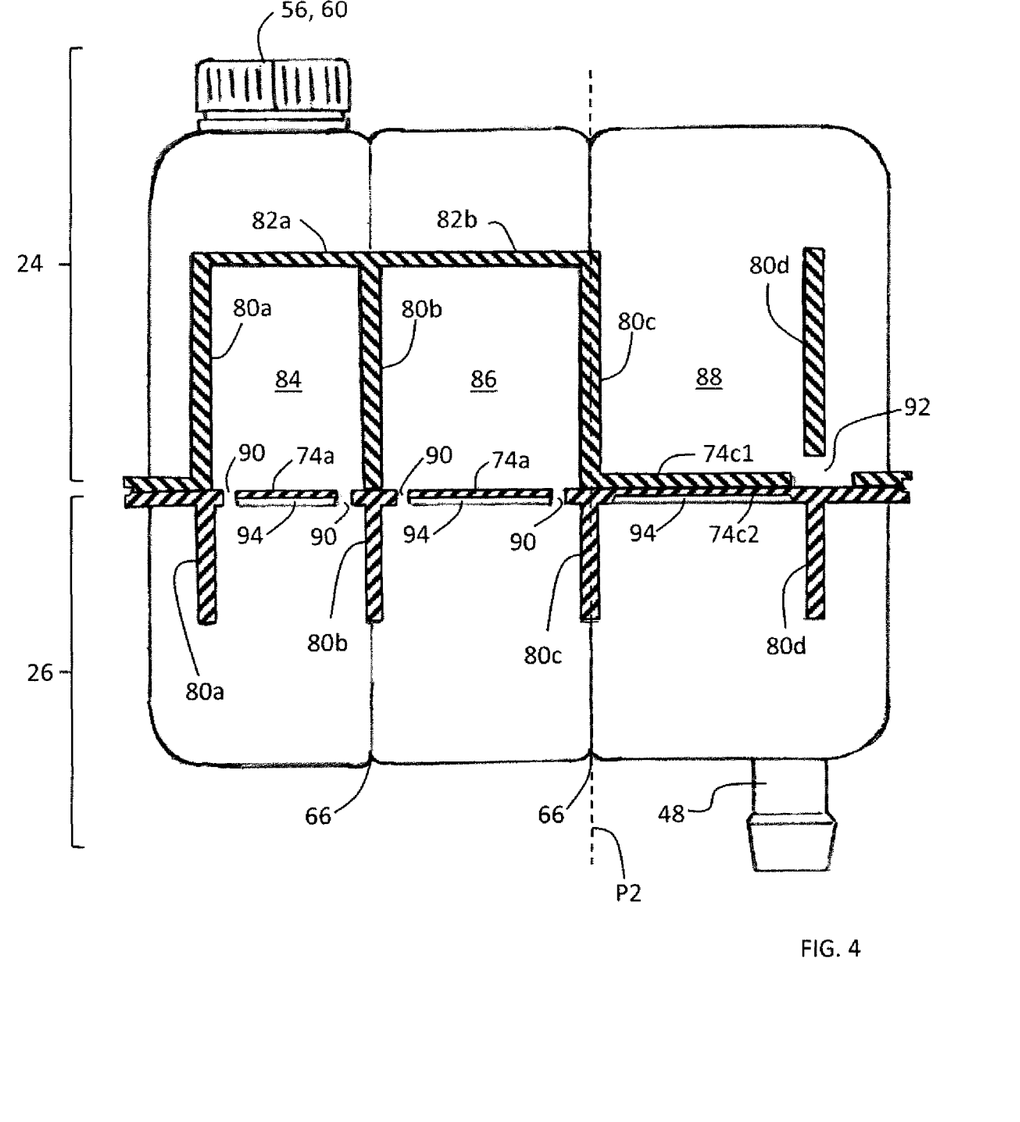
FIG. 4 is a sectional view of the embodiment of FIG. 1, through line B-B.
Figure 5:
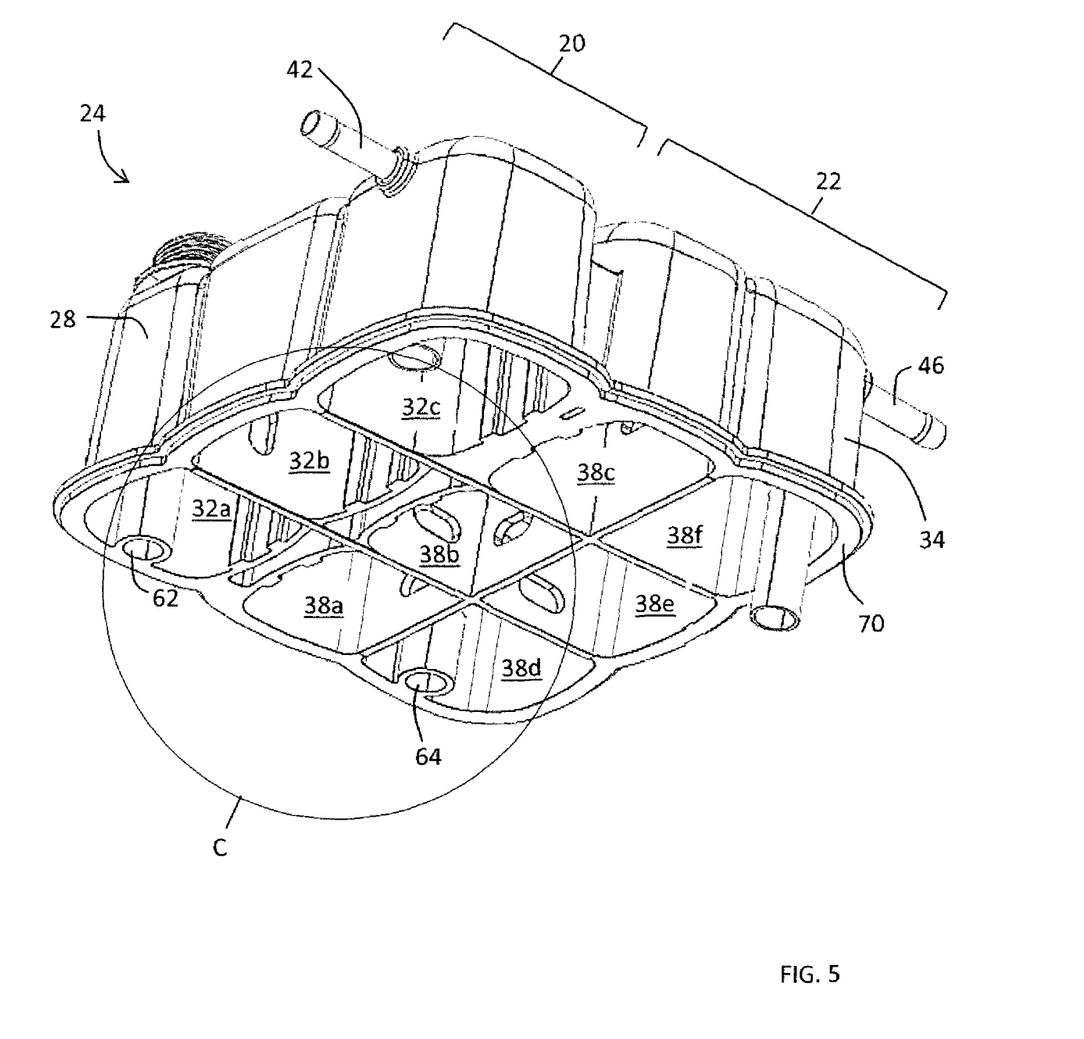
FIG. 5 is a bottom perspective view of a first reservoir member of the embodiment to FIG. 1.
Figure 5A:
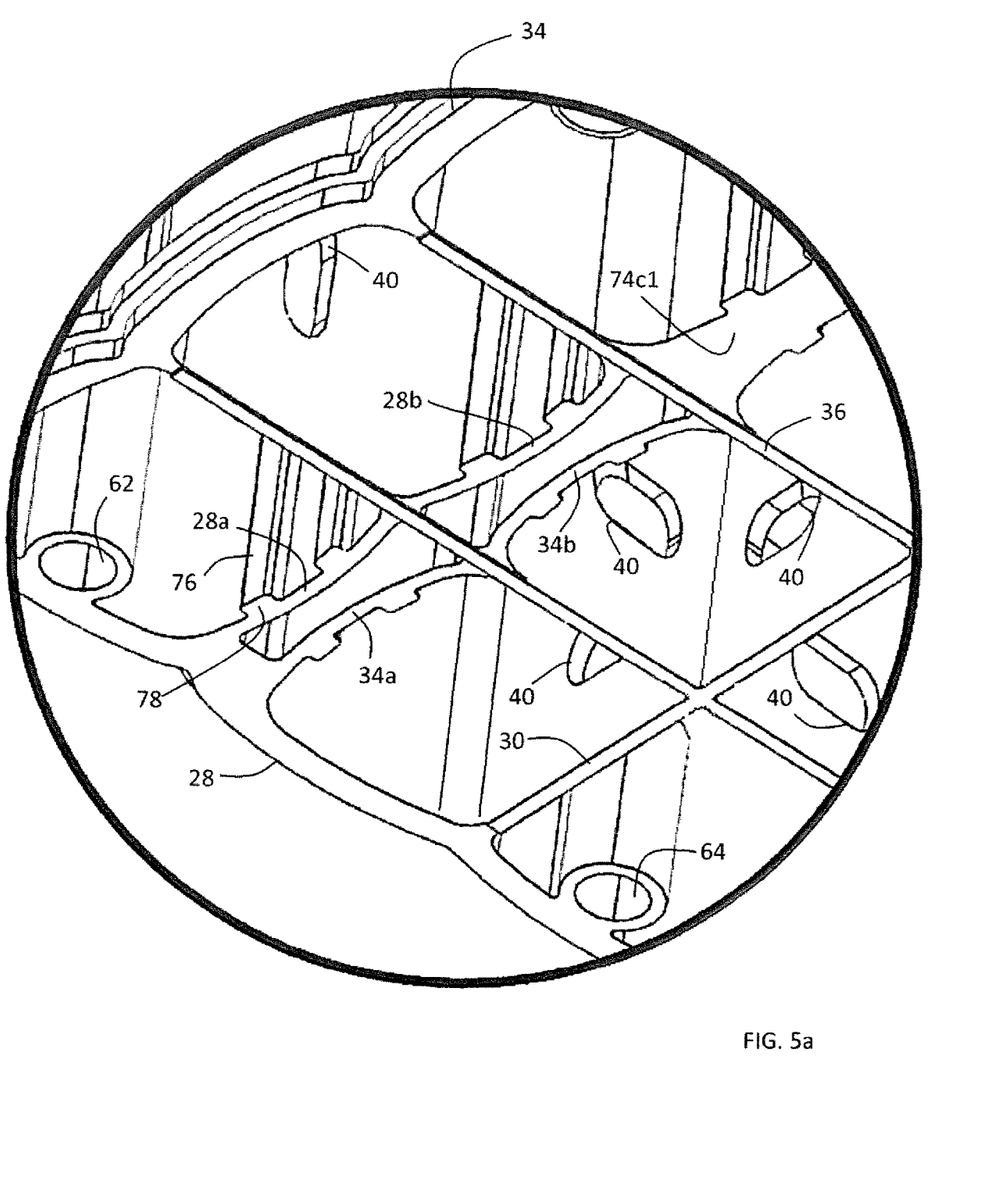
FIG. 5a is a detailed view of a portion of the first reservoir member of the embodiment to FIG. 1, identified at C in FIG. 5.
Figure 6:
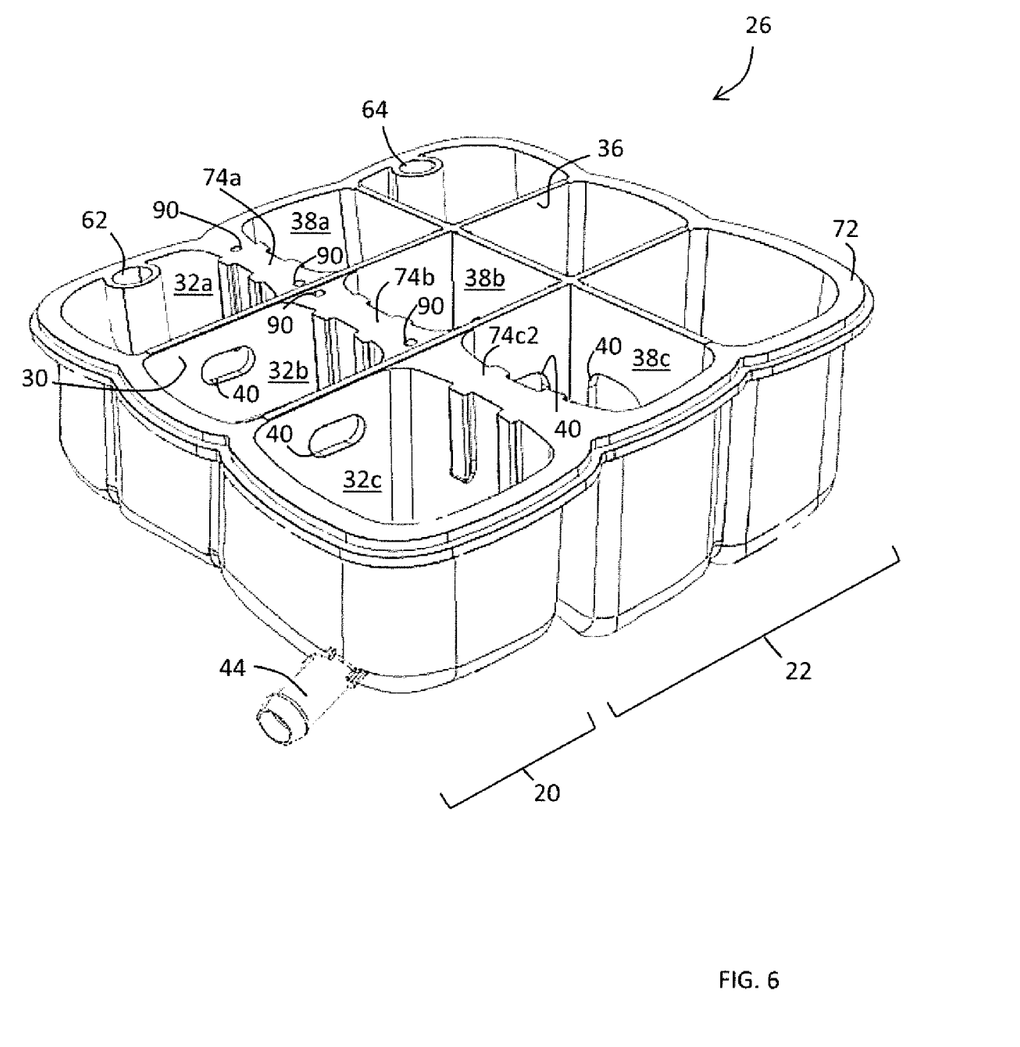
FIG. 6 is a top perspective view of a second reservoir member of the embodiment to FIG. 1.
Figure 7:
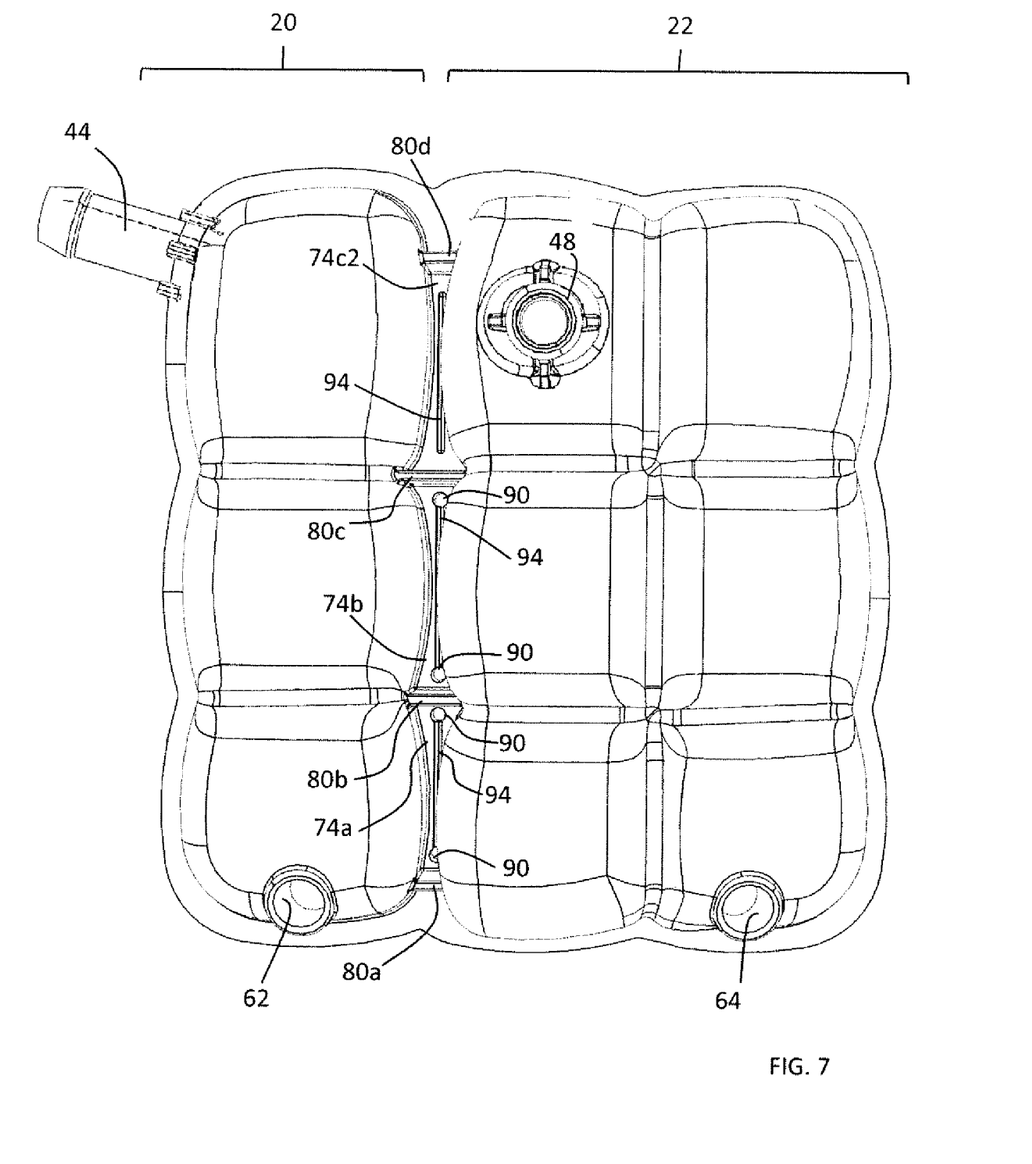
FIG. 7 is a bottom view of the first embodiment of FIG. 1.—

At the assembly plane P1, at least one of the first and second reservoir members 24, 26 provides a linkage, herein referred to as a web to which the housings of the opposing reservoir member is connected. With reference now to FIGS. 4, 5a and 6, between sub-chambers 32a, 38a, a web 74a is provided on the second reservoir member 26. The web 74a is configured for attachment to bond surfaces 28a, 34a provided on a portion of each of the housings 28, 34 defining sub-chambers 32a, 38a of the first and second fluid vessels 20, 22. Similarly, between sub-chambers 32b, 38b, a web 74b is provided on the second reservoir member 26. The web 74b is configured for attachment to bond surfaces 28b, 34b provided on a portion of each of the housings 28, 34 defining sub-chambers 32b, 38b of the first and second fluid vessels 20, 22. Between sub-chambers 32c, 38c of the first and second fluid vessels 20, 22, the first reservoir member 24 presents a web 74c1, while the second reservoir members 26 presents a web 74c2. The webs 74c1, 74c2 are similarly joined together.

To enhance the strength of the joined interface, in particular in the intermediate area of gap G, additional surface area may be provided to the housings 28, 34. Accordingly, an inside surface of the housings 28, 34 of the first and second fluid vessels 20, 22, in particular those joined at the assembly plane P1 may be provided with one or more ribs 76 (best seen in FIG. 5a) that present an additional joining surface 78 at the interface between the first and second reservoir members 24, 26. The ribs 76 may also provide additional strength to the housings 28, 34, resisting deformation of the vessel wall under pressure. The first and second reservoir members 24, 26 may also be joined at intermediate points within each of the first and second fluid vessels 20, 22, namely along the interior walls 30, 36 defining the various sub-chambers.

The peripheral flanges 70, 72, as well as the various intermediate points of contact between the first and second reservoir members 24, 26 may be joined using a variety of suitable methods that achieve a leak-tight seal. For example, the first and second reservoir members 24, 26 may be joined by heat welding, a method of assembly generally known in the art. It will be appreciated that other methods to achieve a leak-tight seal are known, and could be suitably implemented during the assembly of the multi-vessel reservoir assembly 10.

The linkage between the first and second fluid vessels 20, 22 may additionally include at least one primary connector element extending across the gap G between the adjacent but spaced-apart housings 28, 34. As shown, four primary connector elements 80a, 80b, 80c, 80d (collectively primary connector element 80; see FIG. 4) interconnect the housings 28, 34 of the first and second fluid vessels 20, 22. The primary connector elements 80 may be oriented in a connector plane P2 that is angularly offset in relation to the assembly plane P1 defined by the peripheral flanges 70, 72. In the embodiment shown, the connector plane P2 is generally perpendicular to the assembly plane P1, although other angular offsets may be selected, depending on the design of the reservoir assembly. The primary connector elements 80 are provided on both the first and second reservoir members 24, 26, extending generally upwards and generally downwards from the assembly plane P1.

In addition to the at least one web and at least one primary connector element, the linkage between the first and second fluid vessels 20, 22 may additionally comprise a secondary connector element. As shown, two secondary connector elements 82a, 82b (collectively secondary connector element 82; see FIG. 4) interconnect the housings 28, 34 of the first and second fluid vessels 20, 22. The secondary connector elements 82 span the gap between adjacent primary connector elements 80. As shown, the secondary connector element 82a spans the gap between primary connector elements 80a, 80b, while the secondary connector element 82b spans the gap between the primary connector elements 80b, 80c. Accordingly, the area defined by the primary and secondary connector elements 80, 82, and the web 74 at the assembly plane P1 defines an isolation pocket. As shown, two isolation pockets 84, 86 are provided. In other areas without the secondary connector elements, the area defined by the adjacent primary connector elements (for example primary connector elements 80c, 80d), and the web 74c1 at the assembly plane P1 defines an isolation cavity 88.

The isolation pockets and isolation cavities incorporate features that allow for drainage and/or equilibration of pressures. In particular, the isolation pockets may be subject to pressure differentials relative to outside atmospheric conditions, generally arising when one of the vessels contains a high temperature fluid. An increase in temperature of the air contained within the isolation pocket could result in a localized increase in pressure, which may influence the operation and/or performance of the other vessel forming part of the same reservoir assembly. To ensure the separately-operable arrangement of the first and second fluid vessels 20, 22 the isolation pockets 84, 86 incorporate one or more vent holes 90. As shown, each isolation pocket 84, 86 presents two vent holes, generally formed in a lowest portion, namely the web 74 forming part of the intermediate contact area between the first and second fluid vessels 20, 22. In addition to ensuring the equilibration of pressures, the vent holes permit for efficient fluid drainage therefrom. Isolation cavities are generally subject to fluid accumulation, in particular when presented with an open top portion. Accordingly, isolation cavities having an open top portion are provided with at least one drainage hole, once again located towards a lower region to facilitate fluid drainage. As shown, the isolation cavity 88 provides the drainage hole 92 at the intersection between the web 74c1 and the primary connector element 80d. It will be appreciated that the configuration of the vent holes 90 and the drainage holes 92 is exemplary, as other features to achieve drainage and/or venting may be incorporated. The intent is to ensure each of the isolation pockets and cavities permits for fluid drainage should any fluid accumulate therein, while also permitting for pressure equilibration with the outside atmosphere. Fluids that may accumulate within the isolation pockets and/or cavities that may necessitate drainage may include fluids vented from the fluid vessels, fluids spilled in the course of filling and/or changing the fluids contained in the fluid vessels, as well as rain, road spray and wash water. The provision of the vent holes 90 also reduces the likelihood of gases being trapped in the isolation pocket during the welding operation, which could have adverse effects on the leak-tight seal intended to be formed therebetween.

To reduce the extent of thermal exchange or influence from one vessel to another, the structures forming the interconnection between the first and second fluid vessels 20, 22 may include features that reduce the cross-sectional profile. For example, the webs 74 presented along the assembly plane P1 between the first and second reservoir members 24, 26 provide a channel 94 (see FIGS. 4 and 7) set at a generally transverse angle relative to the direction of thermal conductivity. As shown, each of the webs 74 present a respective channel 94 on an underside thereof. It will be appreciated that similar channel structures may be provided on the other interconnecting structures, for example the primary and secondary connection elements 80, 82. While the channel 94 is shown as a continuous linear structure, the channel may also present along a non-linear path (i.e. sinusoidal, zig-zag, etc.). The channel 94 may also present as a discontinuous path in either linear or non-linear form. A discontinuous path would provide a series of shorter, spaced-apart channels that are aligned end to end to present an intermittent path of reduced cross-sectional profile.

As stated previously, the assembly plane P1 generally delimits the upper and lower sections of the multi-vessel reservoir assembly. Arranged in this way, the assembly plane P1 is located at an intermediate location relative to the wall forming the housings 28, 34 of the first and second fluid vessels 20, 22. As the first and second reservoir members 24, 26 are joined along the assembly plane P1, in particular by the combination of the web 74 and opposing housings 28, 34 within gap G, the adjacent wall sections of the housings 28, 34 forming the first and second fluid vessels 20, 22 are strengthened. Accordingly, in the instance of volume expansion in one vessel of the reservoir assembly, dimensional changes will be reduced across the gap G between the first and second fluid vessels 20, 22.

The multi-vessel reservoir assembly 10 may be made of any suitable thermoplastic, including but not limited to polypropylene, polyethylene, and polycarbonate. The thermoplastic may also include various fillers known in the art, including but not limited to mineral fillers (i.e. calcium carbonate, talc, etc.) as well as additives, including but not limited to fibrous additives (i.e. glass fibers, carbon fibers, etc.)

Figure 8:
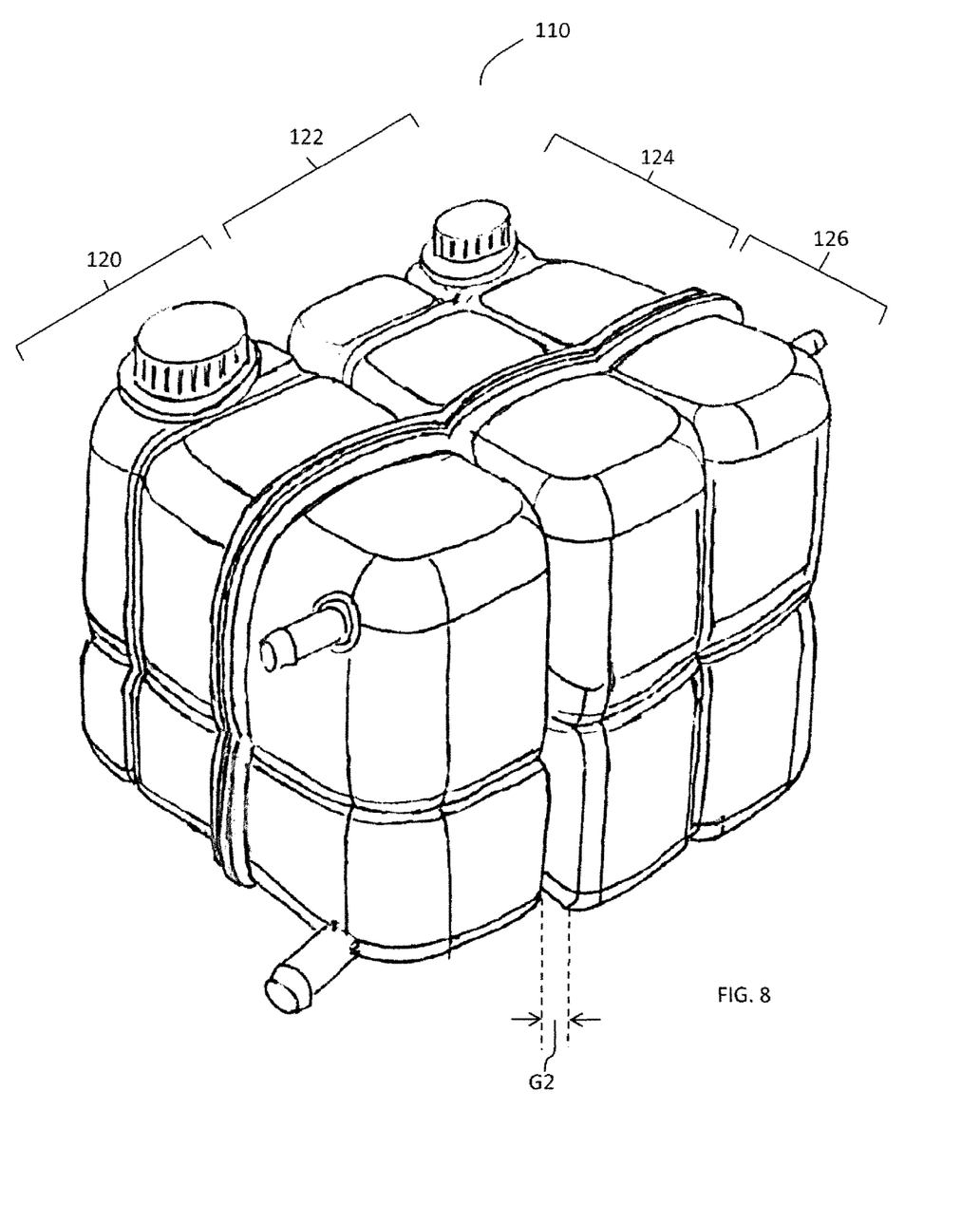
FIG. 8 is a perspective view of an alternate embodiment of the multi-vessel reservoir assembly.

While the multi-vessel reservoir assembly 10 has been exemplified as having an assembly plane P1 that is generally horizontal, in effect comprising the upper and lower reservoir members, other designs of the reservoir assembly may require the assembly plane to be vertically arranged, for example as shown in FIG. 8. In this arrangement, a multi-vessel reservoir assembly 110 including a first fluid vessel 120 and a second fluid vessel 122 is assembled from a first reservoir member 124 and a second reservoir member 126, therein defining a reservoir assembly 110 having a gap G2 as shown. Still further designs may necessitate an assembly interface that follows a compound angle (not shown).

Although exemplified in the form of a multi-vessel reservoir assembly 10, 110 for use in engine cooling systems, the concept could be applied to combine any of the following systems: a. PAS (hybrid electro hydraulic PAS); b. Coolant—standard engine circuit (high temp); c. Coolant—battery loop (low temp); d. Coolant—water cooled charge air cooler/fuel coolers—intermediate loop; e. Brake fluid circuit; f. Washer fluid circuit; g. Clutch fluid circuit; h. Water spray for air to air charge air cooler; and i. Vacuum tank.

The multi-vessel reservoir assembly 10, 110 has a number of advantages over fluid systems used in the prior art. Previous fluid systems incorporated stand-alone fluid reservoirs, that is one reservoir for one fluid system, and for each fluid reservoir, a separate manufacturing process was required. As a substantial improvement over these prior systems, the embodiments presented herein enable:

i) the molding operation to be simplified as a single molding operation can be used to form two independent and separately-operable fluid vessels, namely in the form of the first and second reservoir members;
ii) the welding operation to be reduced to a single operation as a result of combining two independent and separately-operable fluid vessels into the first and second reservoir members (i.e. the first and second reservoir members can be hot plate welded in a single operation by the use of a dual cavity weld nest);
iii) two fluid system may be combined, resulting in improved packaging efficiency (i.e. mounting is common for the two systems), in particular when the two fluid systems involve different fluid types (i.e. an engine coolant and brake fluid reservoir);
iv) lowered manufacturing costs.

It will be appreciated that while the multi-vessel reservoir assembly 10 has been shown as having two thermally and hydraulically isolated reservoir vessels, in some embodiments, the multi-vessel reservoir assembly 10 may include 3 or more thermally and/or hydraulically isolated reservoir vessels.

Relative terms should be construed as such. For example, the term "upper" is meant to be relative to the term "lower," the term "horizontal" is meant to be relative to the term "vertical", the term "top" is meant to be relative to the term "bottom", "inside" is relative to the term "outside", "upwards" is meant to be relative to the term "downwards", and so forth. Unless specifically stated otherwise, the terms "first," "second," "third," and "fourth" are meant solely for purposes of designation and not for order or for limitation.

While various embodiments have been described above, it should be understood that they have been presented only as illustrations and examples of the present disclosure, and not by way of limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the appended claims and their equivalents. It will also be understood that each feature of each embodiment discussed herein, and of each reference cited herein, can be used in combination with the features of any other embodiment. All patents and publications discussed herein are incorporated by reference herein in their entirety.

The invention claimed is:

1. A multi-vessel reservoir assembly comprising:
a first fluid vessel;
a second fluid vessel;
at least one linkage positioned between the first fluid vessel and the second fluid vessel, the at least one linkage serving to maintain the first fluid vessel and the second fluid vessel in fixed and spaced-apart relationship relative to one another, and the at least one linkage including
at least one web presented along an assembly plane, and
at least one primary connector element extending between the first fluid vessel and the second fluid vessel, the at least one primary connector element being oriented in a connector plane that is angularly offset in relation to the assembly plane;
a first reservoir member forming an upper portion and a second reservoir member forming a lower portion, and wherein the first reservoir member and the second reservoir member are joined along the assembly plane; and
at least one secondary connector element, wherein the at least one secondary connector element is situated to span a gap delimited by two adjacent primary connector elements,
wherein the first fluid vessel and the second fluid vessel are independent and separately operable, and are configured to be mounted in an engine compartment of an automobile, and each of the first fluid vessel and the second fluid vessel includes a housing that defines an internal volume, and wherein the at least one linkage is attached to each of the housings of the first fluid vessel and the second fluid vessel.

2. The multi-vessel reservoir assembly according to claim 1, wherein the connector plane defined by the at least one primary connector element is generally perpendicular to the assembly plane.

3. The multi-vessel reservoir assembly according to claim 1, wherein the at least one secondary connector element, in combination with the at least one web and the two adjacent primary connector elements define an isolation pocket.

4. The multi-vessel reservoir assembly according to claim 3, wherein the isolation pocket incorporates at least one vent hole provided in the at least one web to permit for fluid drainage and pressure equilibration with outside atmosphere.

5. The multi-vessel reservoir assembly according to claim 1, wherein the internal volume of at least one of the first fluid vessel and the second fluid vessel includes a plurality of internal walls that subdivide the internal volume into a plurality of sub-chambers.

6. The multi-vessel reservoir assembly according to claim 5, wherein the sub-chambers are interconnected through a series of openings to establish a fluid path therethrough.

7. The multi-vessel reservoir assembly according to claim 1, wherein the first fluid vessel and the second fluid vessel are operable under different temperature and/or pressure conditions.

8. The multi-vessel reservoir assembly according to claim 1, wherein the first fluid vessel and the second fluid vessel are hydraulically separate and are operable with different fluid loop systems.

9. The multi-vessel reservoir assembly according to claim 1, wherein the at least one web and two adjacent primary connector elements define an isolation cavity.

10. The multi-vessel reservoir assembly according to claim 9, wherein the isolation cavity incorporates at least one drainage hole provided at an intersection between the at least one web and at least one of the two adjacent primary connector elements.

11. A multi-vessel reservoir assembly comprising:
a first fluid vessel;
a second fluid vessel; and
at least one linkage positioned between the first fluid vessel and the second fluid vessel, the at least one linkage serving to maintain the first fluid vessel and the second fluid vessel in fixed and spaced-apart relationship relative to one another, and the at least one linkage including
at least one web presented along an assembly plane, and
at least one primary connector element extending between the first fluid vessel and the second fluid vessel, the at least one primary connector element being oriented in a connector plane that is angularly offset in relation to the assembly plane; and
a first reservoir member forming an upper portion and a second reservoir member forming a lower portion, and wherein the first reservoir member and the second reservoir member are joined along the assembly plane,
wherein the first fluid vessel and the second fluid vessel are independent and separately operable, and are configured to be mounted in an engine compartment of an automobile, and each of the first fluid vessel and the second fluid vessel includes a housing that defines an internal volume, and
wherein the at least one linkage is attached to each of the housings of the first fluid vessel and the second fluid vessel, and
wherein the at least one web and two adjacent primary connector elements define an isolation cavity.

12. The multi-vessel reservoir assembly according to claim 11, wherein the isolation cavity incorporates at least one drainage hole provided at an intersection between the at least one web and at least one of the two adjacent primary connector elements.

13. The multi-vessel reservoir assembly according to claim 11, wherein the connector plane defined by the at least one primary connector element is generally perpendicular to the assembly plane.

14. The multi-vessel reservoir assembly according to claim 11, further comprising at least one secondary connector element, wherein the at least one secondary connector element is situated to span a gap delimited by two adjacent primary connector elements, and wherein the at least one secondary connector element, in combination with the at least one web and the two adjacent primary connector elements define an isolation pocket.

15. The multi-vessel reservoir assembly according to claim 14, wherein the isolation pocket incorporates at least one vent hole provided in the at least one web to permit for fluid drainage and pressure equilibration with outside atmosphere.

16. The multi-vessel reservoir assembly according to claim 11, wherein the internal volume of at least one of the first fluid vessel and the second fluid vessel includes a plurality of internal walls that subdivide the internal volume into a plurality of sub-chambers.

17. The multi-vessel reservoir assembly according to claim 16, wherein the sub-chambers are interconnected through a series of openings to establish a fluid path therethrough.

18. The multi-vessel reservoir assembly according to claim 11, wherein the first fluid vessel and the second fluid vessel are operable under different temperature and/or pressure conditions.

19. The multi-vessel reservoir assembly according to claim 11, wherein the first fluid vessel and the second fluid vessel are hydraulically separate and are operable with different fluid loop systems.

* * * * *